United States Patent
Hildebrand et al.

(10) Patent No.: US 6,893,472 B2
(45) Date of Patent: May 17, 2005

(54) DYEING OR PRINTING OF MANUFACTURED NATURAL POLYMER AND SYNTHETIC HYDROPHOBIC FIBER MATERIALS

(75) Inventors: Rainer Hildebrand, Lörrach (DE); Peter Sutter, Muttenz (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 59 days.

(21) Appl. No.: 10/451,170

(22) PCT Filed: Dec. 13, 2001

(86) PCT No.: PCT/EP01/14690

§ 371 (c)(1), (2), (4) Date: Jun. 20, 2003

(87) PCT Pub. No.: WO02/051942

PCT Pub. Date: Jul. 4, 2002

(65) Prior Publication Data

US 2004/0068808 A1 Apr. 15, 2004

(30) Foreign Application Priority Data

Dec. 22, 2000 (CH) .............................. 2510/00

(51) Int. Cl.$^7$ .............................. D06P 3/48; D06P 1/16; C09B 5/34

(52) U.S. Cl. ...................... 8/643; 8/506; 8/677; 8/678; 8/922

(58) Field of Search ............................ 8/643, 506, 922

(56) References Cited

FOREIGN PATENT DOCUMENTS

| | | | |
|---|---|---|---|
| DE | 1278391 | | 9/1968 |
| FR | 1301068 | | 8/1962 |
| GB | 713512 | | 8/1954 |
| GB | 905449 | * | 9/1962 |
| GB | 1022652 | | 12/1962 |
| GB | 963519 | | 7/1964 |
| GB | 1385003 | * | 2/1975 |

OTHER PUBLICATIONS

English Abstract for DE 1278391 (1968).

* cited by examiner

Primary Examiner—Margaret Einsmann
(74) Attorney, Agent, or Firm—Kevin T. Mansfield

(57) ABSTRACT

The present invention relates to a process for dyeing or printing manufactured natural polymer or synthetic hydrophobic fiber materials, characterized in that it comprises using dyes of the formula (I), where $R_1$ is hydrogen, hydroxyl or a radical —NHCO—$R_6$, where $R_6$ is $C_1$–$C_6$alkyl or unsubstituted or $C_1$–$C_4$alkyl- or halogen-substituted phenyl, $R_2$ is hydrogen, hydroxyl or a radical W—$R_7$, where W is —NHCO— or —S— and $R_7$ is $C_1C_6$alkyl or unsubstituted or $C_1$–$C_4$alkyl- or halogen-substituted phenyl, $R_3$ is hydrogen, $R_4$ is hydrogen or hydroxyl, $R_5$ is hydrogen, halogen, methoxy, phenoxy or phenylthio, or $R_3$ and $R_4$ combine to form the radical of the formula (II), where the rings A and B may independently bear further substituents, to the use of these dyes for trichromatic dyeing of manufactured natural polymer or synthetic hydrophobic fiber materials and mass dyeing of plastics materials and to producing solid on-tone combinations of plastics material and manufactured natural polymer or synthetic fiber material.

3 Claims, No Drawings

DYEING OR PRINTING OF MANUFACTURED NATURAL POLYMER AND SYNTHETIC HYDROPHOBIC FIBER MATERIALS

The present invention relates to a process for dyeing or printing manufactured natural polymer or synthetic hydrophobic fibre materials.

Dyes useful for dyeing or printing manufactured natural polymer or synthetic hydrophobic fibre materials, especially disperse dyes, i.e. dyes devoid of water-solubilizing groups, are well known.

However, it has been determined that the dyeings or prints obtained with these dyes do not always fully meet the highest requirements, especially with regard to hot light fastness. There is accordingly a need for novel processes to produce hot light fast dyeings or prints having good general fastnesses.

It has now been found that, surprisingly, the dyeings or prints resulting from the process of the invention substantially meet the criteria indicated above.

The present invention accordingly provides a process for dyeing or printing manufactured natural polymer or synthetic hydrophobic fibre materials, characterized in that it comprises using dyes of the formula

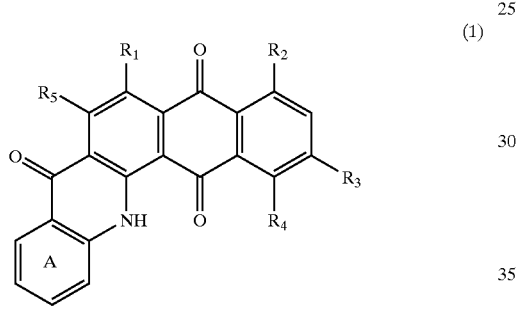

(1)

where $R_1$ is hydrogen, hydroxyl or a radical —NHCO—$R_6$, where $R_6$ is $C_1$–$C_6$alkyl or unsubstituted or $C_1$–$C_4$alkyl- or halogen-substituted phenyl, $R_2$ is hydrogen, hydroxyl or a radical W—$R_7$, where W is —NHCO— or —S— and $R_7$ is $C_1$–$C_6$alkyl or unsubstituted or $C_1$–$C_4$alkyl- or halogen-substituted phenyl, $R_3$ is hydrogen, $R_4$ is hydrogen or hydroxyl, $R_5$ is hydrogen, halogen, methoxy, phenoxy or phenylthio, or $R_3$ and $R_4$ combine to form the radical of the formula

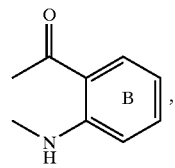

where the rings A and B may independently bear further substituents.

Useful optional substituents for the rings A and B include in particular halogen, $C_1$–$C_4$alkyl and $C_1$–$C_4$alkoxy. They may be present more than once.

$C_1$–$C_6$Alkyls $R_6$ and $R_7$ include for example methyl, ethyl, propyl, isopropyl, n-butyl, isobutyl, sec-butyl, tert-butyl, amyl, tert-amyl (1,1-dimethylpropyl), 1,1,3,3-tetramethylbutyl, neopentyl, hexyl, 1-methylpentyl, cyclopentyl, cyclohexyl and the associated isomers.

$C_1$–$C_4$Alkyl as a substituent on phenyl or as a substituent on the rings A and B is methyl, ethyl, propyl, isopropyl, n-butyl, isobutyl, sec-butyl and tert-butyl.

$C_1$–$C_4$Alkoxy as a substituent on the rings A and B is for example methoxy, ethoxy, propoxy and butoxy.

Halogen is bromine, iodine and especially chlorine.

$C_1$–$C_6$Thioalkyl W—$R_7$ is for example methylthio, ethylthio, propylthio or butylthio.

Of the dyes of the formula (1), blue dyes of the formulae

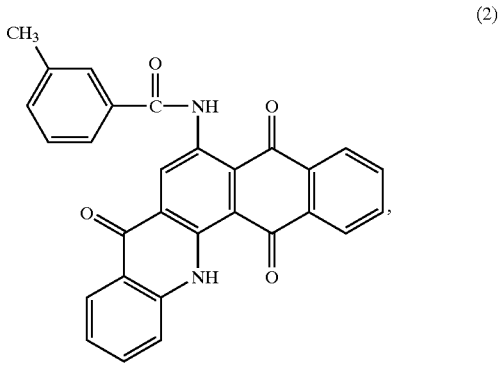

(2)

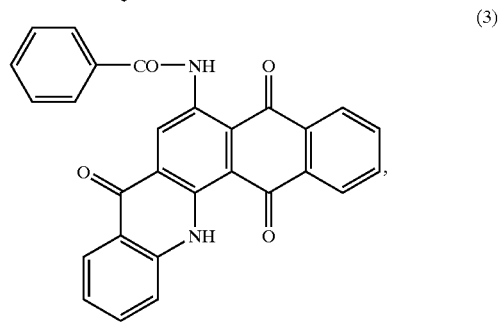

(3)

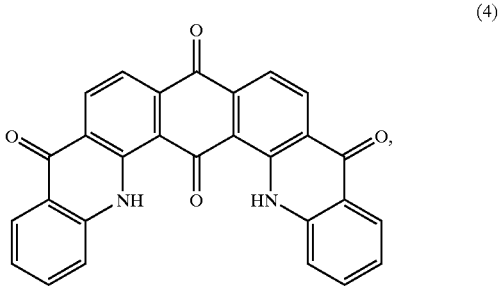

(4)

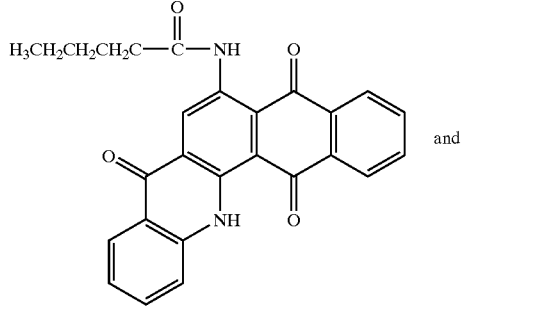

(5)

and (6)

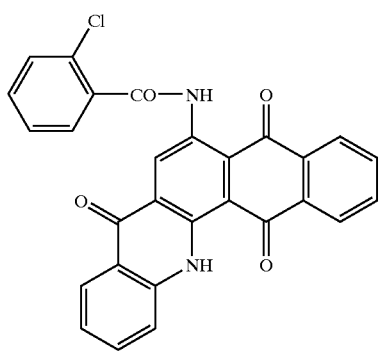

are preferred.

Preference, among the dyes of the formula (1), is likewise given to the red dyes of the formulae (7)

(8)

(9) and (10)

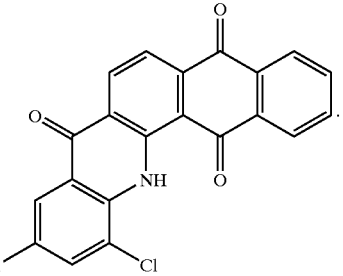

Particular preference is given to the dyes of the formulae (2) and (7).

The dyes used according to the invention are known or preparable by known processes.

The dye of the formula (7) is new and forms part of the subject-matter of the present invention.

The dye of the formula (7) is preparable similarly to known compounds, by processes known per se.

The dye of the formula (7) is obtained for example by ring closure of the compound of the formula (50)

in oleum/chlorosulfonic acid and subsequent reaction of the resultant intermediate of the formula (51)

with a compound of the formula $(CH_3)_2-CH-COCl$.

The compound of the formula (50) is known and preparable by known methods.

The dyes of the formula (1) are useful for dyeing and printing manufactured natural polymer and especially synthetic hydrophobic fibre materials, especially textile materials.

Textile materials composed of blend fabrics comprising such manufactured natural polymer or synthetic hydrophobic fiber materials are likewise dyeable or printable with the dyes of the invention.

Useful manufactured natural polymer textile materials are especially cellulose acetate and cellulose triacetate.

Synthetic hydrophobic textile materials are especially linear aromatic polyesters, for example polyesters formed from a terephthalic acid and glycols, particularly ethylene glycol, or condensation products of terephthalic acid and 1,4-bis(hydroxymethyl)-cyclohexane; polycarbonates, for example those formed from α,α-dimethyl-4,4'-dihydroxydiphenylmethane and phosgene; or fibres based on polyvinyl chloride or polyamide.

The dyes of the formula (1) used according to the invention are applied to the textile materials according to known dyeing processes. For example, polyester fibres are exhaust dyed from an aqueous dispersion in the presence of customary anionic or nonionic dispersants with or without customary carriers at temperatures between 80 and 140° C., preferably between 120 and 135° C. Cellulose acetate is preferably dyed at between 60 to 85° C. and cellulose triacetate at up to 115° C.

The dyes used according to the invention dye adjacent wool and cotton only minimally, if at all, i.e., exhibit a very good wool and cotton reserve, so that they may also be used to good effect for dyeing polyester-wool and polyester-cellulosic blend fabrics.

The dyes used according to the invention are useful for dyeing by the thermosol, exhaust and continuous processes and for printing processes. The exhaust process is preferred. The liquor ratio depends on the apparatus, the substrate and the make-up form. However, the liquor ratio can be chosen to be within a wide range, for example in the range from 4:1 to 100:1, but it preferably is between 6:1 to 25:1.

The amounts in which the individual dyes can be used in dyebaths or print pastes vary within wide limits, depending on the desired depth of shade. Advantageous amounts will generally be 0.01% to 15% by weight and especially 0.1% to 10% by weight, based on weight of fibre or based on the print paste.

The textile material mentioned may be present in the various processing forms, for example as a fibre, yarn or web or as a woven or loop-formingly knitted fabric.

It is advantageous to convert the dyes used according to the invention into a dye preparation before use. For this, the dyes are ground so that their particle size is between 0.01 and 10 microns, preferably on average between 0.1 and 1 micron. The grinding may be effected in the presence of dispersants. For example, the dried dye is ground with a dispersant or kneaded in paste form with a dispersant and then dried under reduced pressure or by spray drying. The preparations thus obtained can be used to prepare print pastes and dyebaths by adding water.

Printing utilizes the customary thickeners, for example modified or nonmodified natural products, for example alginates, British gum, gum arabic, crystal gum, carob bean flour, tragacanth, carboxymethylcellulose, hydroxyethylcellulose, starch or synthetic products, for example polyacrylamides, polyacrylic acid or copolymers thereof, or polyvinyl alcohols.

The dyes used according to the invention confer on the materials mentioned, especially on polyester material, level blue or red shades having very good user fastnesses, such as in particular good sublimation fastness and very good light fastness. An outstanding feature is very good wash fastness. The dyes according to the invention are further notable for good exhaustion and build-up.

The dyes used according to the invention are also useful for producing combination shades together with other dyes or together with a suitable yellow dye for trichromatic dyeing.

The invention further provides the manufactured natural polymer or synthetic hydrophobic fibre material, preferably polyester textile material, dyed or printed by the process mentioned.

The present invention further provides a process for trichromatic dyeing or printing of manufactured natural polymer and especially synthetic hydrophobic fibre materials, which is characterized in that it comprises using at least one blue-dyeing dye of the formulae (2), (3), (4), (5) or (6), together with at least one red-dyeing dye of the formulae (7), (8), (9), (10),

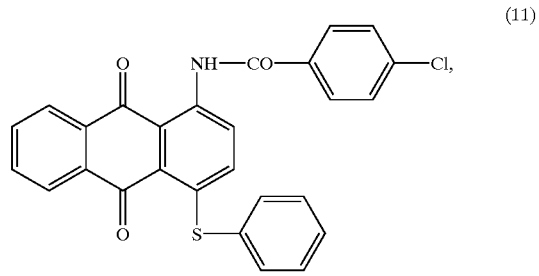

(11)

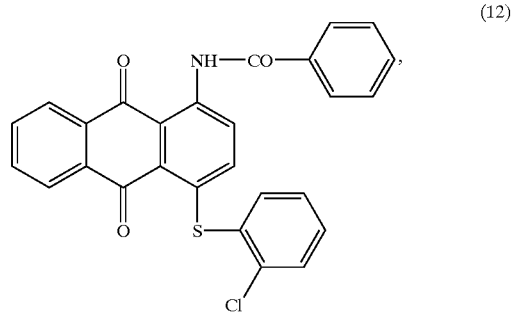

(12)

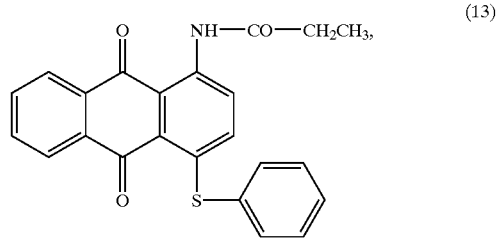

(13)

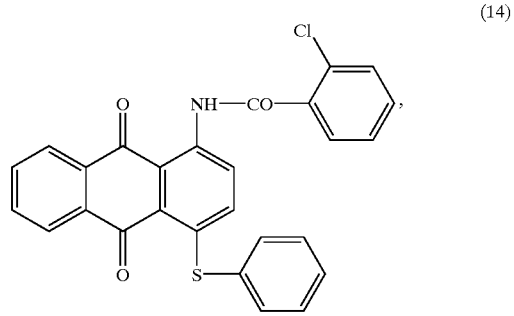

(14)

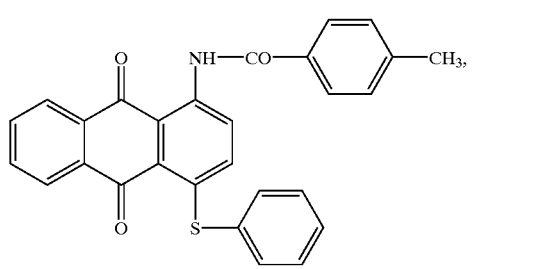

(15)

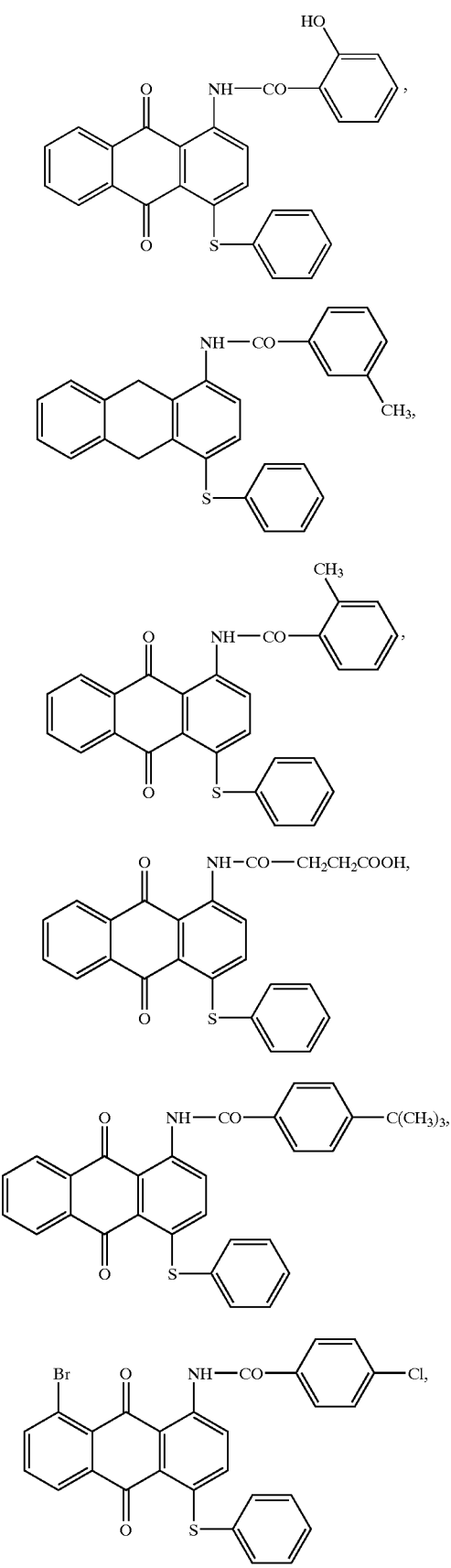
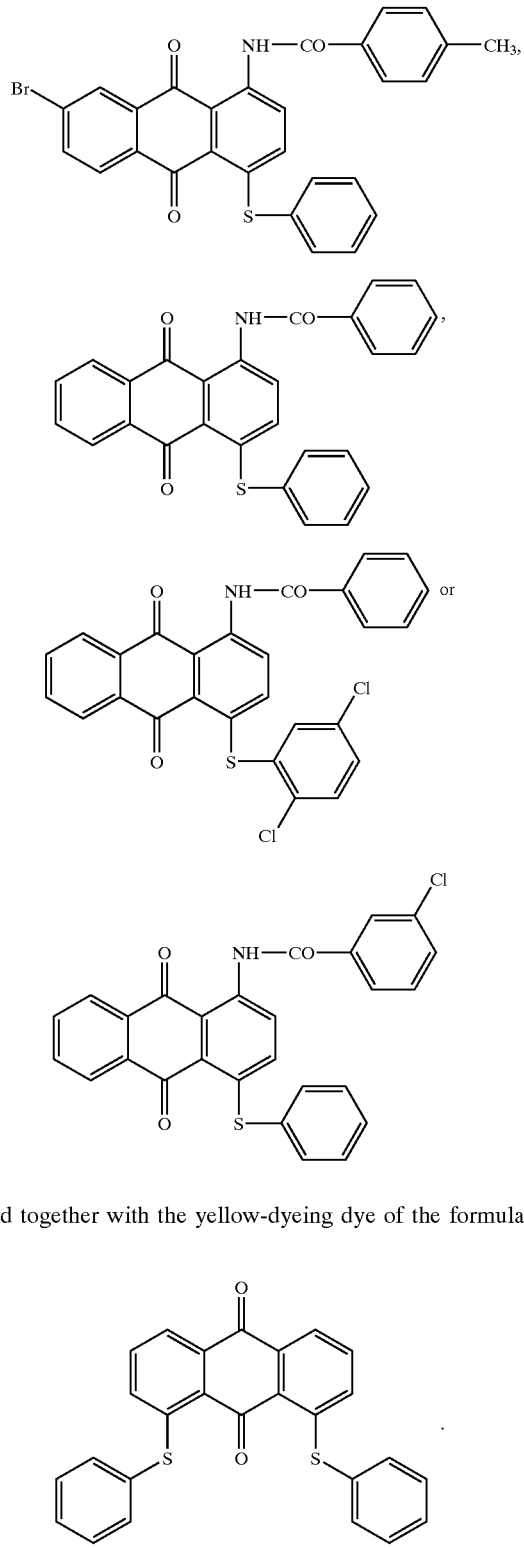
and together with the yellow-dyeing dye of the formula
The dyes of the formula (11) to (26) are known or preparable similarly to known dyes by processes known per se.
Trichromism is the additive colour mixture of appropriately selected yellow- or orange-, red- and blue-dyeing dyes whereby any desired hue of the visible spectrum can be matched by suitable choice of the amount ratios of the dye components.

A preferred embodiment of the trichromatic process according to the invention is characterized in that the blue-dyeing dye of the formula (2) is used together with the red-dyeing dye of the formula (7) and the yellow-dyeing dye of the formula (26).

A further preferred embodiment of the trichromatic process according to the invention is characterized in that the blue-dyeing dye of the formula (2) is used together with the red-dyeing dye of the formula (14) and the yellow-dyeing dye of the formula (26).

The present invention further provides trichromatic dye mixtures comprising at least one blue-dyeing dye of the formulae (2) to (6) together with at least one red-dyeing dye of the formulae (7) to (25) and together with a yellow-dyeing dye of the formula (26).

The inventive process for trichromatic dyeing or printing may be applied to the customary dyeing and printing processes respectively. The dyeing liquors or print pastes, in addition to water and dyes, may contain further additives, for example wetting agents, antifoams, levelling agents or agents to influence the properties of the textile material, for example softeners, flame retardants or soil, water and oil repellents, and also water softeners and natural or synthetic thickeners, for example alginates and cellulose ethers.

The inventive process for trichromatic dyeing or printing is also useful for dyeing from short liquors, for example in continuous dyeing processes or batch and continuous foam dyeing processes.

Preference is given to dyeing, especially dyeing by the exhaust process.

Dyeing is preferably carried out at a pH of 3 to 7, especially 3 to 5. The liquor ratio can vary within wide limits, for example from 5:1 to 50:1, preferably 5:1 to 30:1. Dyeing is preferably carried out from 100 to 140° C., especially 120 to 135° C.

The trichromatic mixtures of the invention are likewise useful for mass-colouring plastics.

The dyes used in the trichromatic process of the invention are notable in trichromatic dyeing or printing for good hue constancy over various concentrations, good fastnesses and dispersibility and especially for very good compatibility and uniform colour build-up.

The dye of the invention and the dyes used according to the invention are further notable for also being suitable for the mass-colouring of plastics in that the mass-dyed plastics comprise the same hue and metamerism and the same fastnesses as manufactured natural polymer or synthetic hydrophobic fibre materials printed or dyed from the bath, whereby the dyes may be used not only individually but also in the form of a trichromatic mixture.

The present invention accordingly further provides a process for producing tone-intone dyed combinations of plastics material and manufactured natural polymer or synthetic fibre material, especially textile material, characterized in that it comprises mass colouring the plastics material and printing or dyeing the manufactured natural polymer or synthetic fibre material from the dyebath using the same dye of the formula (1).

Such a combination may be made up for example of plastics parts and upholstery of domestic furniture such as an easy chair or a three piece suite, or of plastics panels or fittings and seat covers forming parts of a motor vehicle.

Tone-in-tone dyeings for the purposes of the present invention have CIELAB coordinates where $\Delta E \leq 2.0$ (as per German industrial standard DIN 6174).

To obtain tone-in-tone dyeings by exhaust dyeing, the dye quantities should be determined by taking into account the degree of exhaustion of the dyes, which is customarily between 80 and 99.9% and generally between 90 and 99.9% for polyester materials.

Regarding te manufactured natural polymer or synthetic fibre material the above descriptions and preferences are also valid.

Plastics useful for mass dyeing include for example dyeable high molecular weight organic materials (polymers) having a dielectric constant $\geq 2.5$, especially polyester, polycarbonate (PC), polystyrene (PS), polymethyl methacrylate (PMMA), polyamide, polyethylene, polypropylene, styrene/acrylonitrile (SAN) or acrylonitrile/butadiene/styrene (ABS). Preference is given to polyester and polyamide. Particular preference is given to linear aromatic polyesters obtainable by polycondensation of terephthalic acid and glycols, especially ethylene glycol, or condensation products of terephthalic acid and 1,4-bis(hydroxymethyl) cyclohexane, for example polyethylene terephthalate (PET) or polybutylene terephthalate (PBTP); polycarbonates, for example polycarbonates formed from $\alpha,\alpha$-dimethyl-4,4'-dihydroxydiphenylmethane and phosgene; or polymers based on polyvinyl chloride or polyamide, for example nylon 6 or nylon 6.6.

Very particular preference is given to plastics based on linear aromatic polyesters, for example those formed from terephthalic acid and glycols, particularly ethylene glycol, or condensation products of terephthalic acid and 1,4-bis(hydroxymethyl)-cyclohexane.

The plastics are dyed for example by mixing the dye components of the trichromatic mixture into these substrates using roll mills or mixing or grinding apparatus whereby the dyes are dissolved or finely dispersed in the plastic. The plastic with the admixed dyes is then processed in a conventional manner, for example by calendering, pressing, extrusion, spread coating, spinning, casting or injection moulding, whereby the dyed material acquires its ultimate shape. The mixing of the dyes can also be effected directly prior to the actual processing step, for example by continuously metering solid, for example pulverulent, dyes and a granulated or pulverulent plastic and also optionally additional substances such as for example additives simultaneously directly into the inlet zone of an extruder where the mixing-in takes place just prior to the processing. In general, however, prior mixing of the dyes into the plastic is preferable, since more uniformly dyed substrates are obtainable.

The invention further provides the dyed or printed hydrophobic fibre material, preferably polyester textile material, and also the mass-dyed plastics provided by the aforementioned processes.

The examples hereinbelow illustrate the invention. Parts and percentages are by weight, unless otherwise stated. Temperatures are in degrees Celsius. Parts by weight relate to parts by volume as the gram relates to the cubic centimeter.

EXAMPLE 1

A reaction vessel is charged with 145.0 parts by weight of concentrated sulfuric acid and 70.0 parts by weight of chlorosulfonic acid. 36.0 parts by weight of the compound of the formula (50)

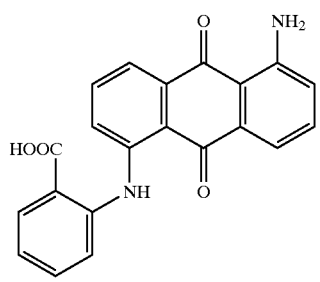

are added at 25° C. and the mixture is subsequently stirred at 25–30° C. for 2 hours. It is then discharged onto 1 500 parts by weight of ice/water and the precipitated product is filtered off with suction, washed neutral and dried.

This provides 32.0 parts by weight of the compound of the formula (51)

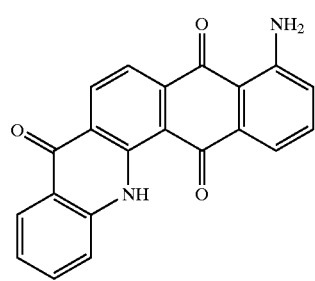

17.0 parts by weight of the compound of the formula (53) are introduced into 20 parts by weight of pyridine and 150 parts by weight of nitrobenzene and the mixture is heated to 110° C. A solution of 7.2 parts by weight of isobutyryl chloride in 15 parts by weight of nitrobenzene is added dropwise over about 30 minutes at 110° C. The mixture is subsequently stirred for 2 hours.
The reaction mixture is then cooled down to 20–40° C., filtered directly or after dilution with methanol, and the filter residue is washed with methanol and water and dried. This provides 18.0 parts by weight of the dye of the formula (7)

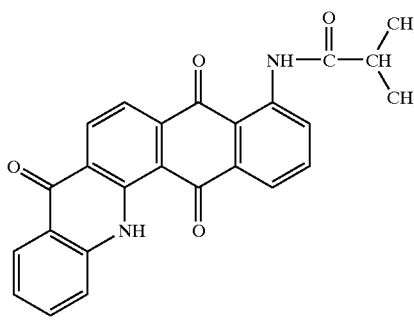

which dyes polyester in a lightfast red shade.

EXAMPLE 2

100 g of polyester fabric are immersed at room temperature and at a liquor ratio of
20:1 into a liquor containing
0.07 g of the dye of the formula (7),
0.058 g of the dye of the formula (2),
0.57 g of the dye of the formula (26),
1 g/l of ammonium sulfate and
0.5 g/l of a commercially available levelling agent and having the pH 4.5–5 adjusted with 80% formic acid. The liquor is then heated to 60° C. at a rate of 3° C./minute and subsequently to 130° C. at a rate of 2° C./minute. The liquor is held at 140° C. for 60 minutes. The liquor is subsequently cooled down to 40° C., and the dyed polyester fabric is washed with water and reduction cleared at 70–80° C. in a bath containing 5 ml/l of 30% sodium hydroxide solution, 2 g/l of 85% sodium dithionite solution and 1 g/l of a commercially available laundry detergent, for 20 minutes. The completed dyeing is subsequently washed with water and dried. The dyeing obtained is beige and has good all-round fastnesses, especially excellent light fastnesses.

EXAMPLE 3

100 g of polyester fabric are immersed at room temperature and at a liquor ratio of 20:1 into a liquor containing
0.086 g of the dye of the formula (14),
0.181 g of the dye of the formula (2),
0.41 g of the dye of the formula (26),
1 g/l of ammonium sulfate and
0.5 g/l of a commercially available levelling agent and having the pH 4.5–5 adjusted with 80% formic acid. The liquor is then heated to 60° C. at a rate of 3° C./minute and subsequently to 130° C. at a rate of 2° C./minute. The liquor is held at 140° C. for 60 minutes. The liquor is subsequently cooled down to 40° C., and the dyed polyester fabric is washed with water and reduction cleared at 70–80° C. in a bath containing 5 ml/l of 30% sodium hydroxide solution, 2 g/l of 85% sodium dithionite solution and 1 g/l of a commercially available laundry detergent, for 20 minutes. The completed dyeing is subsequently washed with water and dried. The dyeing obtained is dark grey and has good all-round fastnesses, especially excellent light fastnesses.

EXAMPLE 4

1 200.00 g of polyester chips (PET Arnite D04-300, DSM) are predried at 130° C. for 4 hours and subsequently mixed with
0.24 g of the dye of the formula (7)
in a roller rack at 60 revolutions per minute for 15 minutes until homogeneous. The homogeneous mixture is extruded on a twin screw 25 mm extruder (from Collin, D 85560 Ebersberg) comprising 6 heating zones at a maximum temperature of 275° C., quenched with water, granulated in a Turb Etuve TE 25 granulator (from MAPAG AG, CH 3001 Bern) and subsequently dried at 130° C. for 4 hours. This provides red polyester chips having good all-round fastnesses, especially very good light and hot light fastnesses.

EXAMPLE 5

Example 2 is repeated using 0.7 g of the dye of the formula (2) instead of the dye mixture. The dyeing obtained is blue and has good all-round fastnesses, especially excellent light fastnesses.

What is claimed is:
1. A process for trichromatic dyeing or printing of manufactured natural polymer and especially synthetic hydrophobic fibre materials, characterized in that it comprises using at least one blue-dyeing dye of the formulae

(2)
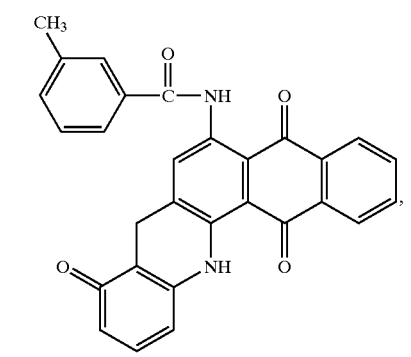
(3)
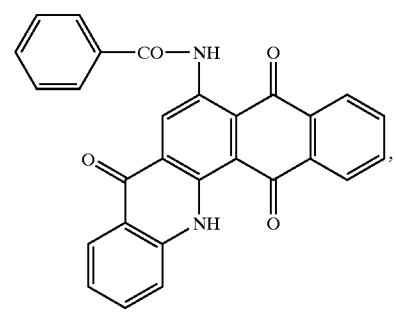
(4)
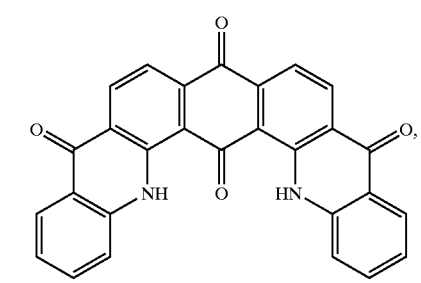
(5)
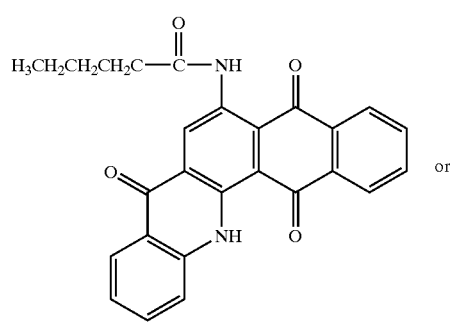
or
(6)
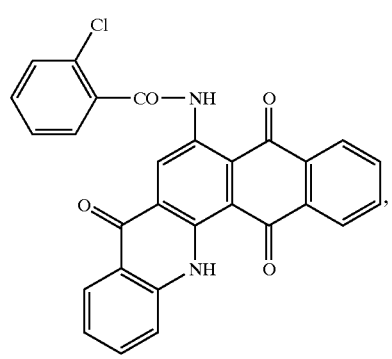
together with at least one red-dyeing dye of the formulae
(7)
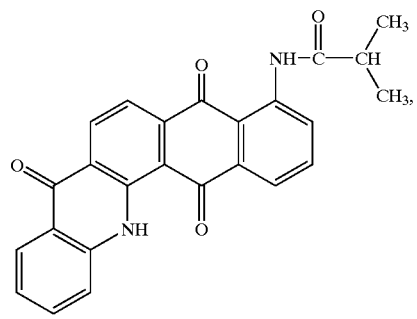
(8)
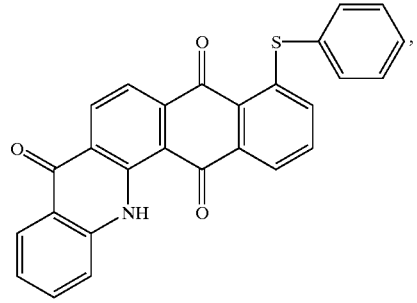
(9)
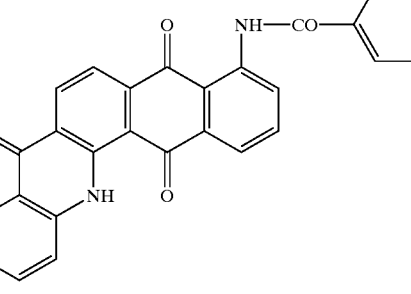
(10)
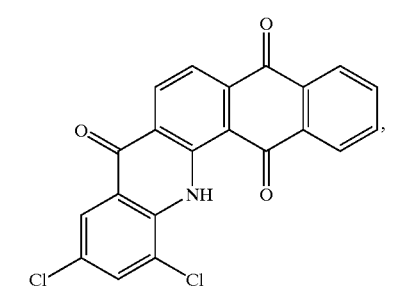
(11)
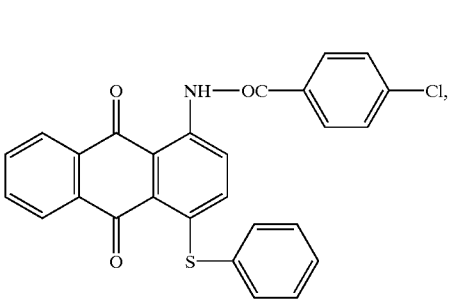

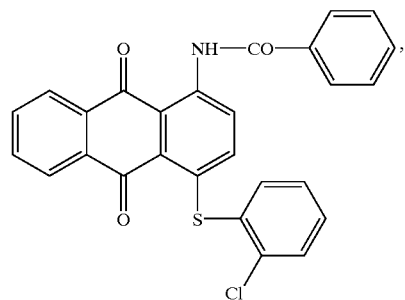
(12)
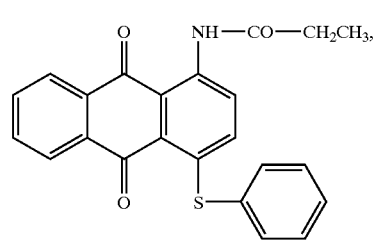
(13)
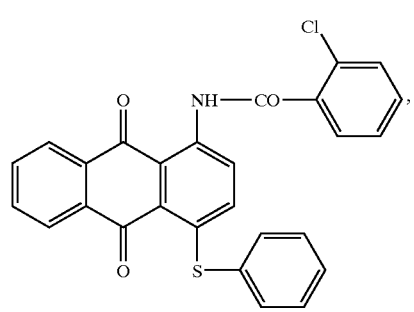
(14)
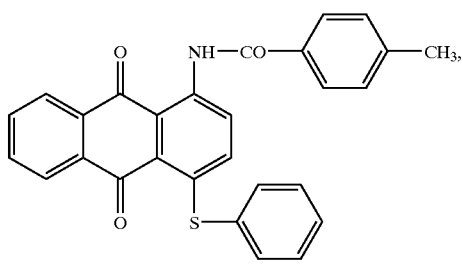
(15)
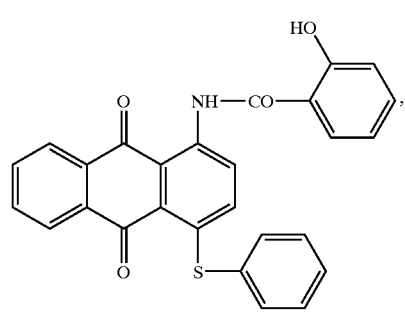
(16)
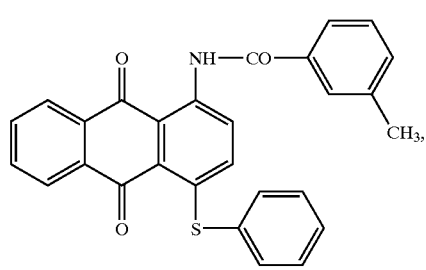
(17)
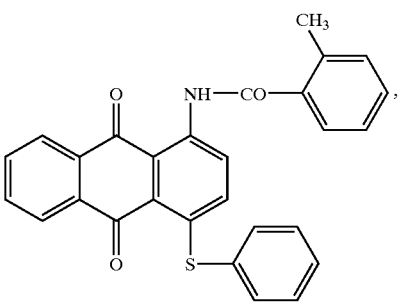
(18)
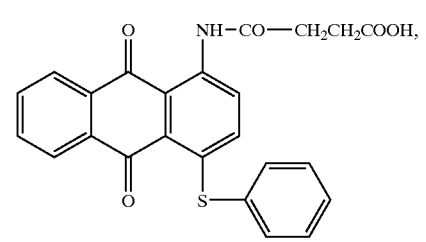
(19)
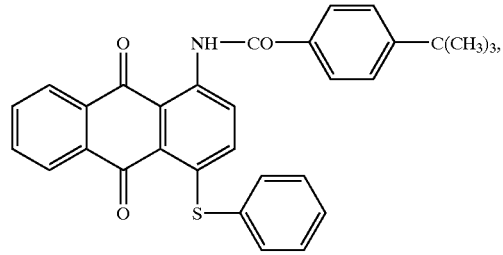
(20)
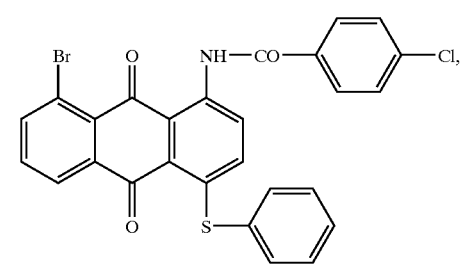
(21)
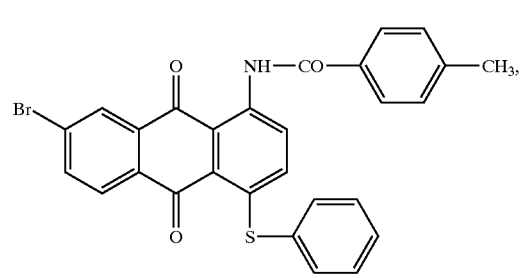
(22)

-continued (23)

(24) or (25)

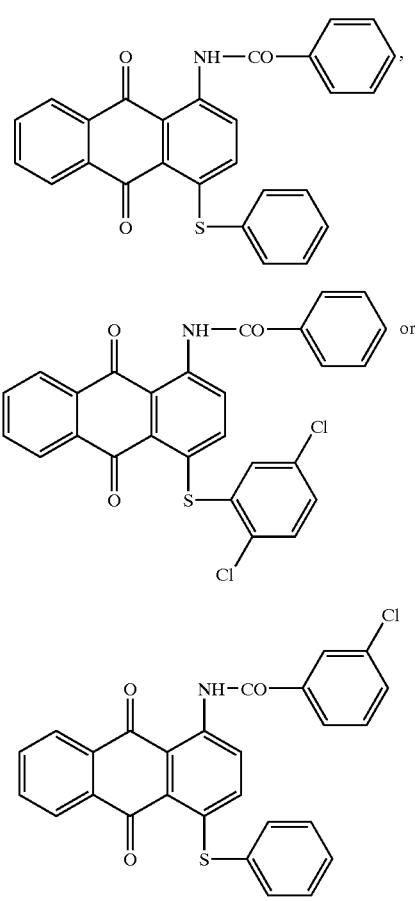

and together with the yellow-dyeing dye of the formula (26)

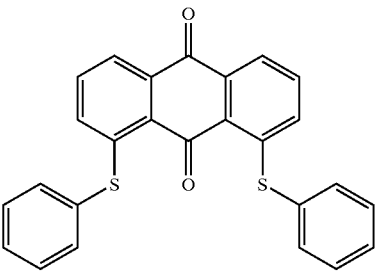

2. Trichromatic dye mixtures comprising at least one blue-dyeing dye of the formulae (2) to (6) together with at least one red-dyeing dye of the formulae (7) to (25) and together with a yellow-dyeing dye of the formula (26) as described in claim 1.

3. A process for producing tone-in-tone dyed combinations of plastics material and manufactured natural polymer or synthetic fibre material, characterized in that it comprises mass dyeing the plastics material and printing or dyeing the manufactured natural polymer or synthetic fibre material from the dyebath using the same trichromatic mixture as claimed in claim 2.

* * * * *